Patented Apr. 4, 1944

2,346,091

UNITED STATES PATENT OFFICE 2,346,091

PRODUCTION OF TITANIUM OXIDE PIGMENTS

Henry Moroni Stark and John Lewis Keats, Wilmington, Del., assignors to E. I. du Pont de Nemours & Company, Wilmington, Del., a corporation of Delaware No Drawing. Application July 8, 1941, Serial No. 401,448

13 Claims. (Cl. 23—202)

This invention relates to the production of pigment-useful titanium oxide, and more particularly to the preparation of improved titanium oxide pigments which, upon X-ray analysis, are characteristically in the rutile crystalline pattern.

More specifically, the invention relates to a novel method for preparing rutile titanium oxide pigments by converting hydrolyzed, raw pigment anatase at relatively low calcination temperatures.

While it is well known that precipitated, raw anatase $TiO_2$ obtained from the hydrolysis of titanium sulfate solutions may be converted to rutile by calcination treatment, temperatures of a relatively high order and well in excess of 1000° C. have been considered essential for the purpose. However, such excessively high temperatures exert an adverse effect upon the properties of the final pigment, causing it to become undesirably poor in such essential pigment properties as tinting strength, color and hiding power, and rendering it wholly unfit for ordinary pigment applications, especially in coating compositions, such as paints, enamels, lacquers, etc.

We have found that the methods and the conditions which prevail during hydrolytic precipitation of the raw pigment anatase greatly influence not only the characteristics of the hydrolysate obtained, but the temperature which is required to convert it to rutile. Also, we have found that if the precipitation conditions are suitably controlled, an anatase hydrolysate can be recovered which will readily convert to rutile and at a very much lower and relatively moderate calcination temperature, whereby the relatively poor pigment properties which prior converted rutile pigments have exhibited and the disadvantages inherent in prior methods for obtaining the same through calcination can be effectively overcome.

Accordingly, it is among the objects of the present invention to provide a novel method for attaining these and other advantageous results. A salient object is to provide a novel and useful process for converting anatase to rutile and at relatively moderate temperatures of calcination, to insure a final pigment having excellent tinting strength, color and hiding power. A further object is to provide a novel process for hydrolyzing relatively concentrated titanium sulfate solutions, the raw pigment product from which is readily converted to rutile of high strength and excellent color when calcined at relatively low temperatures. Another object is to provide a process for hydrolyzing titanium sulfate solutions of relatively low acid concentration, in order that the hydrolytic precipitate obtained therefrom will possess relatively high rutile-forming tendencies.

These and other objects and advantages are attainable in this invention which embodies the discovery that when a relatively concentrated titanium salt solution is subjected to controlled conditions of hydrolysis and precipitation, as raw pigment anatase, of a portion only of the hydrolyzable $TiO_2$ particles present in said solution is effected, subsequent calcination of the recovered hydrolysate at a relatively moderate temperature well below that considered necessary for effecting conversion of the anatase to rutile enables one to obtain an improved rutile $TiO_2$ pigment exhibiting excellent and satisfactory tinting strength, color, hiding power and other essential properties.

In a more specific and preferred embodiment, our improved rutile titanium oxide pigment is obtained by hydrolyzing a nucleated, relatively concentrated titanium salt solution, especially titanium sulfate, having a relatively low acid concentration, to precipitate therefrom, as raw pigment anatase, a predetermined, definite and substantial portion of the hydrolyzable particles of $TiO_2$ present, thereupon completely interrupting the hydrolysis, and then calcining the hydrolysate recovered from such partial hydrolysis at relatively low calcination temperatures, e. g., below substantially 1000° C. and preferably within a range of from about 750 to 950° C.

In a preferred adaptation, we obtain titanium oxide pigments of high tinting strength, color and hiding power, particularly titanium oxide in the rutile crystalline form, by hydrolyzing relatively concentrated titanium salt solutions, especially titanium sulfate liquors, suitably nucleated by incorporating therein colloidal $TiO_2$ or similar seeding agents, prepared from a titanium sulfate solution in accordance with, for instance, the procedures described in U. S. Reissue Patents 18,854 or 18,790 or in U. S. Patent 1,851,487. These seeding agents are adapted to yield an anatase type of $TiO_2$ pigment upon calcination at a temperature below 1000° C. of the hydrolysis precipitate recovered upon their use. The degree of nucleation may be tested conveniently by diluting the concentrated titanium sulfate solution to a concentration below, say, 200 g. $TiO_2$ per liter and boiling for a period of about 3 hours. If a yield above about 90% is attained, nucleation is considered adequate. In accordance with the present invention, solutions of relatively high $TiO_2$ concentrations, i. e., above substantially 200 g. $TiO_2$ per liter, and preferably of about 225 g./l., having a relatively low acidity factor, i. e., a molar ratio of $H_2SO_4$ to $TiO_2$ of approximately 1.0 or less, and which have been suitably nucleated in accordance with procedures such as those mentioned, or by other procedures which give a similar amount of nucleation, are boiled for a sufficient length of time to effect hydrolysis thereof, and after such hydrolysis has progressed to a given but partial extent, hydrolysis is discontinued prior to its completion, in order that the high yields of precipitate which the solution is capable of providing will arbitrarily fail to materialize. Thus, normally the hydrolysis of such type of solution, if allowed to go to completion, would yield in excess of about 90 or 95% of precipitated anatase $TiO_2$. In accordance with our invention, however, after the boiling has proceeded for a relatively short period of time, and preferably at the stage of the hydrolysis when the yield is increasing uniformly with time and the point has not yet been reached at which the curve representing increase of yield with time substantially flattens out, e. g., after a yield of from, say, about 40%, and not to exceed 60%, of the hydrolyzable $TiO_2$ particles present in the solution is precipitated, we arrest the hydrolysis reaction and prevent it from further proceeding by quickly cooling the hydrolysis solution by adding or incorporating therein a suitable quantity of a cooling diluent, e. g., cold water. If desired, any other means may be employed for arresting the hydrolysis reaction, such as by conveniently passing a cooling medium or fluid in indirect heat exchange relationship with the solution undergoing hydrolysis, or by applying a vacuum to said hydrolysis solution in order to bring about its cooling by evaporation. The residual hydrolysis liquor or effluent containing the unhydrolyzed portion of titanium may be conveniently returned or recycled for reuse to an earlier stage of the titanium producing system, such as to the titanium solution preparation operation, and preferably to the acid-ore attack stage of the process. If desired, it may be recirculated to the dissolving operation wherein dissolution of the sulfated ilmenite or other type of titaniferous ore employed in the process is being effected. The precipitated raw anatase pigment obtained from such low yield hydrolysis is then suitably recovered from its mother liquor, subjected to the usual purification treatments, such as washing and filtering, and is then calcined in a conventional type of furnace in order to develop its pigment properties and substantially completely convert the same to rutile. In such calcination treatment, we resort to temperatures below substantially 1000° C., and preferably of the order of from about 750-950° C. The calcined product is then subjected to the usual grinding and finishing operations, the final product comprising an excellent rutile pigment having high tinting strength and color characteristics, whereby it becomes eminently suited for all manners of commercial pigment application, especially in coating compositions, such as paints, enamels, lacquers, etc.

To a more complete understanding of the invention, the following specific examples are given, which are merely by way of illustration and not in limitation of the invention:

*Example I*

Titanyl sulfate of low acidity was prepared by dissolving precipitated titanium oxide in sulfuric acid, adjusting the sulfuric acid content of the solution to about 700 grams $H_2SO_4$ per liter, crystallizing titanyl sulfate ($TiOSO_4.2H_2O$) from the solution by heating at 100° C. and removing excess sulfuric acid from the crystals by washing with alcohol. The crystals of titanyl sulfate were dissolved in water and a solution containing 343 grams $TiO_2$ and 448 grams $H_2SO_4$ per liter was obtained. This acidity is equivalent to 1.06 mols $H_2SO_4$ per mol $TiO_2$. Hydrolysis of this solution was carried out as follows: 585 cc. of the solution was heated to 97° C. and was run at a uniform rate into 305 cc. water held at 92° C. in 2½ minutes. The dilute solution contained the equivalent of 225 grams $TiO_2$ per liter. The suspension was boiled for a period of 20 minutes at which time the yield was 55%. The hydrolysis was stopped by quickly diluting the suspension with cold water. At the time the hydrolysis was stopped, the yield was increasing uniformly with time and the point had not yet been reached at which the curve representing increase of yield with time flattens out. The precipitate was filtered and the acid filtrate containing unhydrolyzed titanium was reused by adding it to the liquor from which the titanyl sulfate was precipitated. The precipitate obtained in the hydrolysis was calcined for 30 minutes at 850° C. The calcined product was examined by the X-ray method of analysis and was found to be all crystalline rutile. The product was a superior pigment having tinting strength of 195 compared with 150 for commercial anatase and having excellent color.

*Example II*

Titanyl sulfate was prepared by dissolving precipitated titanium oxide in sulfuric acid, adjusting the acid content to 700 grams $H_2SO_4$ per liter and heating the solution at 100° C. until crystals separated from the solution. The crystals were dissolved in water to give a solution containing $H_2SO_4$ and $TiO_2$ in the molar ratio of 2.0. Calcium carbonate was added to the solution to reduce the acidity to a molar ratio of 0.6. The precipitated calcium sulfate was separated from the solution by filtration. The solution was hydrolyzed by a procedure similar to that described in U. S. Patent 1,758,528, seed nuclei, prepared by neutralizing titanium sulfate solution to pH=4-5 and aging the precipitate at an elevated temperature, being added to said solution. The amount of seed nuclei added to the low acid titanyl sulfate solution was 0.5% on the $TiO_2$ basis. The solution was boiled for 15 minutes at a concentration of 225 grams $TiO_2$ per liter when the yield was 52%, hydrolysis being arrested by rapid cooling of the solution through cold water addition. The recovered precipitate was then calcined and converted to rutile readily at 850° C. The calcined product was of high tinting strength and excellent color.

*Example III*

Titanium sulfate solution produced by attacking ilmenite with $H_2SO_4$ was concentrated under vacuum to give a solution of the following composition: $TiO_2$=278, Fe=38 and $H_2SO_4$=703 grams per liter. The molar ratio of $H_2SO_4$ not combined with iron and other bases to $TiO_2$ was 1.87. The solution was hydrolyzed as follows: 2860 parts by volume of the concentrated solution was heated to 97° C. and run into 640 parts by volume of water in a period of 16 minutes. The temperature of the water was 92° C. A precipitate formed when the first portion of concentrated solution was added to the water but this precipitate redissolved to give an apparently clear solution as more liquor was added. The solution was brought to boiling and boiled for a period of 3 hours. Precipitation began after boiling for 1½ hours. The yield after boiling 3 hours was 39%, hydrolysis being then interrupted completely by quickly cooling the solution. The precipitate, when calcined, converted to rutile at the unusually low temperature of 850° C. The rutile product was characterized by high tinting strength: 180 compared with 150 for commercial anatase.

*Example IV*

Titanium sulfate solution was prepared as in Example III and concentrated by evaporation until the composition was 260 grams $TiO_2$ and 56 grams Fe per liter. The molar ratio of $H_2SO_4$ not combined with Fe to $TiO_2$ was 1.68. Seed nuclei (0.5% on the $TiO_2$ basis) prepared according to the specifications in U. S. 1,758,528 were added and the concentration of the solution adjusted to 225 grams $TiO_2$ per liter. The solution was boiled for 3 hours when the yield was 44%. At this point the solution was divided, one part being filtered, the other boiled longer. The precipitate from the former was washed and calcined at 950° C. The calcined product was all in the rutile crystal form as shown by the X-ray method of analysis and was characterized by superior tinting strength—184 compared with 150 for commercial anatase. The second part of the hydrolysis solution was boiled an additional 8 hours until the yield was 92%. The precipitate was calcined under the same conditions as for the low yield product. The calcined product in the latter instance, however, was anatase, and had tinting strength of only about 110.

The values given for color and tinting strength were determined substantially in accordance with the procedures described by J. E. Booge and H. E. Eastlack in the Paint, Oil and Chemical Review of April 9 and 16, 1924.

Although the invention has been illustrated in connection with certain preferred embodiments thereof, it is not limited thereto, nor to the specified solutions, concentrations, ratios, temperatures, seeding agents, etc. The invention will be found to be generally adaptable for use in either batch or continuous types of processes or in various combinations of such types. Also, although we preferably employ relatively concentrated titanium sulfate solutions containing substantially 200 g. of $TiO_2$ per liter or above, and usually in excess of substantially 225 g./l., these solutions and concentrations are employed to obtain optimum results hereunder. Thus, other titanium salt solutions, such as the nitrate, chloride, oxalate, etc., may be employed in lieu of said sulfate solutions, as may solutions, (though in some instances with somewhat lesser advantage) containing as low as about 150 g. $TiO_2$ per liter. Similarly, while nucleated solutions diluted to a concentration below about 200 g. $TiO_2$ per liter and which, after boiling for a period of about 3 hours, yield above about 90% of a $TiO_2$ precipitate, are preferred for use, it will be found that solutions which are capable of providing a 90% or above yield when the solution is tested by diluting to 150 g./l., if necessary, and boiled for a period of about 3 hours, may be also usefully employed. Again, while we prefer to employ titanium sulfate solutions characterized by relatively low acidity and having an approximate molar ratio of $H_2SO_4$ to $TiO_2$ of 1.7 or less, satisfactorily favorable results will also be found to obtain in the invention when the acidity of such type of solution ranges to as high as about 1.5 mols $H_2SO_4$ per mol of $TiO_2$. Generally, we have found that a useful free acidity factor (F. A.) in the solution being hydrolyzed may range from 0 to about 90, but should preferably range from 0 to about 70.

While, as stated, we preferably arrest or interrupt the hydrolysis reaction after the occurrence of about 40 to 60% $TiO_2$ precipitation, the hydrolysis may be discontinued, if desired, after substantially 20% precipitation has taken place and in any event prior to substantially 65 or 75% precipitation. The point at which the hydrolysis should be stopped in terms of a per cent increase in yield with time may be readily determined by a curve showing the relation between time and yield. Thus, it will be found advantageous to interrupt the hydrolysis before the curve representing increase of yield with time begins to appreciably flatten out. In preferred adaptations of the invention, we have found that superior rutile pigments are obtained when the hydrolysis is stopped when it has progressed to a point such that the yield is not in excess of substantially 60%, and we have found it convenient to effect such interruption on the steep portion or point where the curve showing yield plotted against time begins to substantially flatten out.

Although we prefer, as indicated, to recycle the liquor containing the unhydrolyzed titanium sulfate separated from the hydrolysate in order to re-use the same in an earlier stage of the process, this step may be dispensed with, if desired and resort to other uses of the separated liquor may be had. When the step of crystallizing the titanium sulfate is involved in a given process, such liquor may be returned for use therein since it will be found to be very advantageous in the crystallization operation because of its relatively high acid/$TiO_2$ ratio.

As will be evident, the present invention affords a novel process for producing improved rutile titanium oxide pigments of high tinting strength and excellent color, through conversion of precipitated raw anatase at relatively low calcination temperatures well below those heretofore considered essential in effecting such conversion. In accordance with the invention, the anatase precipitate is obtained from a low yield hydrolysis operation wherein certain features are observed during the hydrolysis, particularly relatively high $TiO_2$ concentrations, relatively low ratios of $H_2SO_4$ to $TiO_2$ in the solution undergoing hydrolysis, and, after hydrolysis has progressed to a partial but incomplete extent, further hydrolysis is discontinued so that the high yields of precipitate which the solution is capable of providing fail to result. As stated, in previous conversions of anatase to rutile excessively high calcination temperatures have been employed and as a result products of poor color and tinting strength much lower than would be expected from the refractive index relationships, have been produced. The present invention will be found readily adaptable for the manufacture of high quality rutile pigments from various titanium salt solutions, and especially from commercial titanium sulfate solutions (after evaporation to give a higher TiO₂ content than is used in commercial procedures) or from titanyl sulfate solutions at relatively low H₂SO₄/TiO₂ ratios and at high TiO₂ concentrations.

We claim as our invention:

1. A process for obtaining a rutile titanium oxide pigment through conversion of precipitated anatase, comprising hydrolyzing at an elevated temperature a relatively concentrated, low acid-containing titanium sulfate solution containing at least 200 g. TiO₂ per liter capable of yielding at least 90% of precipitated TiO₂ on hydrolysis and nucleated with a seeding agent prepared from a titanium sulfate solution, which agent is adapted to yield an anatase TiO₂ pigment upon calcination at a temperature below 1000° C. of the recovered hydrolysis precipitate, discontinuing the hydrolysis reaction after 20–70% of the hydrolyzable TiO₂ particles present in said solution capable of being hydrolyzed have been precipitated, thereafter recovering the precipitated product and subjecting the same to calcination at temperatures ranging from substantially 750–950° C. to develop its pigment properties and convert the same to substantially rutile.

2. A process for obtaining an improved rutile titanium oxide pigment through conversion of precipitated anatase, comprising hydrolyzing at an elevated temperature a relatively concentrated and low acid-containing titanium sulfate solution containing at least 200 g. TiO₂ per liter capable of yielding at least 90% of precipitated TiO₂ during hydrolysis, said solution having been seeded with a nucleating agent prepared from a titanium sulfate solution, which agent will yield upon hydrolysis of said solution a precipitate adapted to provide anatase TiO₂ upon calcination of said precipitate at a temperature below 1000° C., completely stopping the hydrolysis reaction by cooling treatment after substantially 20 to 60% of the hydrolyzable TiO₂ particles present in said solution have been precipitated, purifying the resulting precipitate and then calcining the same at temperatures ranging from substantially 750–950° C. to develop its pigment properties and substantially completely convert the same to rutile.

3. A process for obtaining an improved rutile titanium oxide pigment through conversion of precipitated anatase, comprising hydrolyzing at an elevated temperature a relatively concentrated and low acid-containing titanium sulfate solution containing at least 200 g. TiO₂ per liter capable of yielding at least 90% of precipitated TiO₂ during hydrolysis said solution having been seeded with a nucleating agent prepared from a titanium sulfate solution, which agent will yield upon hydrolysis of said solution a precipitate adapted to provide anatase TiO₂ upon calcination of said precipitate at a temperature below 1000° C., completely stopping the hydrolysis reaction after substantially 40 to 60% of the hydrolyzable TiO₂ particles present in said solution have been precipitated, purifying the resulting precipitate and then calcining the same at temperatures ranging from substantially 750–950° C. to develop its pigment properties and substantially completely convert the same to rutile.

4. A process for producing a rutile titanium oxide pigment exhibiting high tinting strength and color characteristics, comprising hydrolyzing a titanium sulfate solution containing at least 150 g. of TiO₂ per liter and a ratio of H₂SO₄ to TiO₂ of less than about 1.5 said solution having been seeded with a nucleating agent prepared from a titanium sulfate solution, which agent will yield upon hydrolysis of said solution a precipitate adapted to provide anatase TiO₂ upon calcination of said precipitate at a temperature below 1000° C., discontinuing the hydrolysis reaction after precipitation of from about 20–60% of the hydrolyzable TiO₂ content of such solution has taken place, recovering the precipitated TiO₂ from said hydrolysis, and then subjecting the recovered purified precipitate to calcination at temperatures ranging from substantially 750–950° C. to develop its pigment properties and convert the same to substantially rutile.

5. A process for producing a rutile titanium oxide pigment exhibiting high tinting strength and color characteristics, comprising hydrolyzing a titanium sulfate solution containing in excess of 200 g. TiO₂ per liter and a ratio of H₂SO₄ to TiO₂ of less than about 1.0 said solution having been seeded with a nucleating agent prepared from a titanium sulfate solution, which agent will yield upon hydrolysis of said solution a precipitate adapted to provide anatase TiO₂ upon calcination of said precipitate at a temperature below 1000° C., discontinuing the hydrolysis reaction after precipitation of from about 20–60% of the hydrolyzable TiO₂ content of such solution has taken place, recovering and washing the precipitated TiO₂ from said hydrolysis and then subjecting the recovered purified precipitate to calcination at temperatures ranging from substantially 750–950° C. to develop its pigment properties and convert the same to substantially rutile.

6. A process for producing a rutile titanium oxide pigment exhibiting high tinting strength and color characteristics, comprising hydrolyzing a titanium sulfate solution containing in excess of 200 g. TiO₂ per liter and a ratio of H₂SO₄ to TiO₂ of less than about 1.0 said solution having been seeded with a nucleating agent prepared from a titanium sulfate solution, which agent will yield upon hydrolysis of said solution a precipitate adapted to provide anatase TiO₂ upon calcination of said precipitate at a temperature below 1000° C., discontinuing the hydrolysis reaction after precipitation of from about 40–60% of the hydrolyzable TiO₂ content of such solution has taken place, recovering and washing the precipitated TiO₂ from said hydrolysis and then subjecting the recovered purified precipitate to calcination at temperatures ranging from substantially 750–950° C. to develop its pigment properties and convert the same to substantially rutile.

7. A process for obtaining an improved rutile titanium oxide pigment which comprises subjecting a relatively concentrated titanium salt solution containing in excess of 150 g. TiO₂ per liter to hydrolysis at an elevated temperature said solution having been seeded with a nucleating agent prepared from a titanium sulfate solution, which agent will yield upon hydrolysis of said solution a precipitate adapted to provide anatase TiO₂ upon calcination of said precipitate at a temperature below 1000° C., stopping the hydrolysis reaction by contacting the solution undergoing hydrolysis with a cooling medium after 20% to 70% precipitation has occurred of all of the hydrolyzable TiO₂ particles present in said solution, recovering and purifying the TiO₂ precipitate recovered from such partial hydrolysis, and then calcining said purified precipitate at a temperature sufficient to develop essential pigment properties in said precipitate but below substantially 1000° C.

8. A process for producing an improved rutile titanium oxide pigment exhibiting high tinting strength and excellent color characteristics which comprises subjecting a relatively concentrated titanium salt solution containing in excess of about 200 g. $TiO_2$ per liter to hydrolysis at an elevated temperature, said solution having been seeded with a nucleating agent prepared from a titanium sulfate solution, which agent will yield upon hydrolysis of said solution a precipitate adapted to provide anatase $TiO_2$ upon calcination of said precipitate at a temperature below 1000° C., stopping the hydrolysis reaction after 40% to 60% precipitation of all of the hydrolyzable $TiO_2$ particles present in said solution takes place, separating the precipitated $TiO_2$ from its mother liquor, recycling the residual hydrolysis liquor to the titanium solution preparation operation of the process for re-use therein, recovering and purifying the $TiO_2$ precipitated in said hydrolysis, and then subjecting the recovered precipitate from said hydrolysis to calcination at temperatures ranging from substantially 750–950° C.

9. A process for producing a rutile titanium oxide pigment exhibiting high tinting strength and color characteristics comprising hydrolyzing a titanium sulfate solution containing in excess of about 200 g. $TiO_2$ per liter, and a ratio of $H_2SO_4$ to $TiO_2$ of less than about 1.5 said solution having been seeded with a nucleating agent prepared from a titanium sulfate solution, which agent will yield upon hydrolysis of said solution a precipitate adapted to provide anatase $TiO_2$ upon calcination of said precipitate at a temperature below 1000° C., after precipitation of from about 20–60% of the hydrolyzable $TiO_2$ present in said solution has taken place, discontinuing the hydrolysis reaction by cooling the solution undergoing hydrolysis, recovering and washing the $TiO_2$ precipitated during said hydrolysis, and then subjecting the purified $TiO_2$ precipitate to calcination at temperatures ranging from substantially 750–950° C. to develop its pigment properties and effect conversion thereof to substantially rutile.

10. A process for producing a rutile titanium oxide pigment exhibiting high tinting strength and color characteristics comprising hydrolyzing a titanium sulfate solution containing in excess of about 200 g. $TiO_2$ per liter, and a ratio of $H_2SO_4$ to $TiO_2$ of less than about 1.5 said solution having been seeded with a nucleating agent prepared from a titanium sulfate solution, which agent will yield upon hydrolysis of said solution a precipitate adapted to provide anatase $TiO_2$ upon calcination of said precipitate at a temperature below 1000° C., after precipitation of from about 20–60% of the hydrolyzable $TiO_2$ present in said solution has taken place, discontinuing the hydrolysis reaction by cooling the same through dilution by admixture therewith of sufficient quantity of cold water, recovering and washing the $TiO_2$ precipitated during said hydrolysis, and then subjecting the purified $TiO_2$ precipitate to calcination at temperatures ranging from substantially 750–950° C. to develop its pigment properties and effect conversion thereof to substantially rutile.

11. A process for producing an improved rutile titanium oxide pigment which comprises subjecting a relatively concentrated titanium salt solution containing at least 150 g. $TiO_2$ per liter and a nucleating agent prepared from a titanium sulfate solution, which agent promotes the yield of an anatase $TiO_2$ pigment upon calcination at a temperature below 1000° C. of the recovered hydrolysis precipitate, to hydrolysis at an elevated temperature, stopping the hydrolysis reaction after 20% to 70% precipitation of all of the hydrolyzable $TiO_2$ particles present in said solution occurs, recovering the precipitated $TiO_2$ from said hydrolysis, and thereafter subjecting the recovered $TiO_2$ precipitate to calcination at a temperature sufficient to develop its pigment properties but below substantially 1000° C.

12. A process for obtaining an improved, high strength rutile titanium oxide pigment through conversion of anatase raw pigment, comprising heating a relatively concentrated titanium sulfate solution containing at least 150 g. $TiO_2$ per liter and a nucleating agent prepared from a titanium sulfate solution, which agent promotes the yield of an anatase $TiO_2$ pigment upon calcination at a temperature being 1000° C. of the recovered hydrolysis precipitate, and having a relatively low acid content to effect hydrolysis thereof, arbitrarily stopping the hydrolysis reaction after 20% to 70% of the hydrolyzable $TiO_2$ particles present in said solution and capable of being hydrolyzed therefrom have been precipitated, recovering the precipitated $TiO_2$ from said hydrolysis and then subjecting the resulting precipitated anatase product to calcination at temperatures ranging from about 750° C. to 1000° C. to develop its pigment properties and convert the same to substantially rutile.

13. A process for obtaining an improved, high strength rutile titanium oxide pigment through conversion of anatase raw pigment which comprises heating a relatively concentrated titanium sulfate solution containing at least 200 g. $TiO_2$ per liter and a nucleating agent prepared from a titanium sulfate solution, which agent promotes the yield of an anatase $TiO_2$ pigment upon calcination at a temperature below 1000° C. of the recovered hydrolysis precipitate, and having a relatively low acid content to an elevated temperature to effect hydrolysis thereof, arbitrarily stopping the hydrolysis reaction after from about 20 to about 65% of the hydrolyzable $TiO_2$ particles present therein have been precipitated, recovering and purifying the precipitated $TiO_2$ from said hydrolysis, and then calcining the recovered precipitate at temperatures ranging from about 750–950° C. to develop its pigment properties and convert the same to substantially rutile.

HENRY MORONI STARK,
JOHN LEWIS KEATS.

CERTIFICATE OF CORRECTION.

Patent No. 2,346,091. April 4, 1944.

HENRY MORONI STARK, ET AL.

It is hereby certified that error appears in the printed specification of the above numbered patent requiring correction as follows: Page 3, second column, line 20, for "75%" read --70%--; line 58, for "features" read --factors--; page 5, second column, line 29, claim 12, for "being" read --below--; and that the said Letters Patent should be read with this correction therein that the same may conform to the record of the case in the Patent Office.

Signed and sealed this 30th day of May, A. D. 1944.

(Seal)

Leslie Frazer
Acting Commissioner of Patents.